Patented Sept. 10, 1946

2,407,481

UNITED STATES PATENT OFFICE 2,407,481

PROCESS OF PREPARING SULPHAMIDE

Edward F. Degering, West Lafayette, Ind., and George C. Gross, Richmond, Va., assignors to Purdue Research Foundation, West Lafayette, Ind., a corporation of Indiana No Drawing. Application December 3, 1941, Serial No. 421,488

11 Claims. (Cl. 23—190)

It is the object of our invention to prepare sulphamide efficiently and economically.

In carrying out our invention, we produce a reaction between sulphuryl chloride and ammonia, under conditions which efficiently and economically produce sulphamide. The reaction is:

(1) 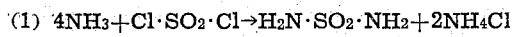
$$4NH_3 + Cl \cdot SO_2 \cdot Cl \rightarrow H_2N \cdot SO_2 \cdot NH_2 + 2NH_4Cl$$

The mere reaction of sulphuryl chloride and ammonia is not new with us. Indeed, that reaction has been known for over a century; for it was carried out by Traube in 1838, to produce some very impure sulphamide. But during all the intervening time, although various workers have attacked the problem, no reaction conditions have heretofore been found under which that reaction would produce sulphamide effectively and economically. Indeed, hitherto the reaction has been so violent that most of whatever sulphamide was produced was immediately destroyed by decomposition and/or condensation. No way has hitherto been known for moderating that violence, and for preventing the destruction of the sulphamide that may have been produced so that sulphamide could be recovered in substantial yield and pure form.

We have found that we can obtain good yields of sulphamide by that reaction, and can largely prevent the destruction of the sulphamide produced, by maintaining the temperature during the reaction below 90° C., at which temperature we have found the destruction to begin, but above the melting point of ammonia, which is approximately —78° C. Since ammonia boils at about —33° C., we can thus use the ammonia in either the liquid phase or the gaseous phase; but we prefer to operate with it in the liquid phase, and thus to maintain the temperature below the boiling point of the ammonia. We prefer also that the sulphuryl chloride be in the liquid phase; and while sulphuryl chloride itself melts at about —54° C., it remains in liquid phase when in solution in a suitable inert diluent at temperatures which may be below the —78° C. melting point of ammonia. Thus at ordinary pressure we can operate with both reactants in the liquid phase from about —78° C. to about —33° C., but by increasing the pressure we can maintain both reactants in the liquid phase, if we wish to do so, all the way up to the maximum of 90° C. which we have established as the safe upper temperature limit for the reaction.

The maintenance of the temperature in this range throughout the reaction, and throughout the area of reaction, is desirable regardless of what other conditions are maintained. But we can moderate the violence of previous reactions, and can get good yields of sulphamide, by other conditions—for best results when these other conditions are maintained along with the maintenance of temperatures below 90° C.

These other conditions are the presence of an excess of ammonia beyond the four molecular equivalents required for the reaction, the presence of an inert diluent, preferably in excess of the amount of sulphuryl chloride, and desirably both.

The ammonia is desirably not only in excess of 4 mols per mol of sulphuryl chloride—which is the amount required for the production (2 mols) of the sulphamide and for the neutralization (2 more mols) to ammonium chloride of the hydrochloric acid formed as a by-product—but in excess of 10 mols per mol of sulphuryl chloride. In addition, the mixing should be by putting the sulphuryl chloride into the ammonia, instead of the reverse, so that it is the ammonia which will be in excess during the mixing. This is best done by injecting the sulphuryl chloride, desirably dissolved in an inert solvent, into a stream of ammonia, having the ammonia liquid and the stream turbulent, and maintaining the stream cooler than 90° C.

The inert diluent, such as petroleum ether or chloroform or carbon tetrachloride, should be present in greater amount by weight than the sulphuryl chloride, and should be a solvent for the sulphuryl chloride, and desirably also, at least to some extent, for the ammonia, although the solubility of ammonia in inert solvents is low. The amount of diluent may be much greater than indicated, with no upper limit; but for convenience we desirably have the amount of the diluent between 1 and 100 parts by weight per part of sulphuryl chloride.

The following are examples of our invention:

Example 1

One hundred thirty grams of sulphuryl chloride is diluted with 200 ml. of petroleum ether, conveniently at room temperature, and the resultant mixture (or solution) is injected slowly into 400 ml. of liquid ammonia (which may be but need not also be diluted with petroleum ether). The liquid ammonia is in a pressure vessel, in which the pressure is maintained between 15 and 150 (or even more) pounds per square inch; and is maintained at a temperature not in excess of —40° C., as by a bath of carbon-dioxide snow (Dry Ice). The injection of the mixture of sulphuryl chloride and petroleum ether is sufficiently slow that the heat from the reaction, which is strongly exothermic, is prevented from raising the temperature in the reaction vessel above that −40° C.; and usually requires about 30–40 minutes, at least. The liquid ammonia is vigorously agitated, by a suitable stirrer, during the injection, to facilitate cooling and avoid excessive local heating. When all the sulphuryl chloride and petroleum ether have been added, and the reaction is completed, the resultant mixture is removed from the cooling bath, and gently warmed, at least to room temperature but in any case to not over 90° C., to remove the excess ammonia; and, if desired, to remove also the petroleum ether. The residue, which is mostly sulphamide and ammonium chloride, is now extracted with a suitable solvent of sulphamide, such as methyl acetate; to obtain a solution from which the sulphamide is readily recoverable by evaporating off the solvent. Instead of methyl acetate we may use other solvents of sulphamide, such as methyl formate, ethyl formate, ethylmethyl ketone, etc.

We find that we get increased yield if prior to the extraction with the solvent of sulphamide we first dissolve the reaction products in water, acidify (as with HCl or $H_2SO_4$ for instance), allow to stand for three or four days, and then evaporate to dryness under vacuum below 90° C., and make the extraction of the residue from that evaporation.

Example 2

Instead of the batch process of Example 1, we may use a continuous process; and we prefer the continuous process. To that end, we inject a stream of sulphuryl chloride, desirably diluted with an inert diluent, such as petroleum ether or chloroform or carbon tetrachloride, into a larger stream of liquid ammonia, which may be similarly diluted. The stream of ammonia is made to flow at a rate and under conditions which cause turbulence, and the turbulent flow produces the intimate mixing of the two streams. The temperature is maintained below 90 C°., in any suitable way.

For instance: Liquid ammonia is forced through a pipe 0.10 inch in diameter at a rate of 12 liters per hour. The pipe is maintained at about −45° to −50° C., as by being surrounded with solid carbon-dioxide. Sulphuryl chloride is injected into the stream of liquid ammonia in the pipe at the rate of 700 grams per hour. The sulphuryl chloride may be undiluted, but is desirably diluted with at least as great a volume of petroleum ether, say supplied at the rate of 100 ml. per hour. The liquid ammonia may be similarly diluted with petroleum ether prior to the injection into it of the sulphuryl chloride, but the desirability of diluting the liquid ammonia is not so great, because of its low solubility in inert solvents, as is the desirability of diluting the sulphuryl chloride. The reaction occurs in the pipe, to produce the desired sulphamide; which is recovered from the reaction product discharged from the pipe in the same manner as it is recovered in Example 1. The unreacted ammonia driven off by the gentle warming may be recycled.

We claim as our invention:

1. The process of making sulphamide, which consists in adding sulphuryl chloride to ammonia, with the ammonia in sufficient amount so that throughout the reaction it is always in excess of 10 mols per mol of sulphuryl chloride, and after reaction has occurred recovering sulphamide from the reaction mixture.

2. The process of making sulphamide as set forth in claim 1, with the addition that throughout the reaction and throughout the area of the reaction the temperature is maintained between −78° C. and +90° C.

3. The process of making sulphamide as set forth in claim 1, with the addition that the ammonia is maintained in liquid phase.

4. The process of making sulphamide as set forth in claim 1, with the addition that both the ammonia and the sulphuryl chloride are maintained in liquid phase.

5. The process of making sulphamide as set forth in claim 1, with the addition that a substantial amount of an inert diluent is present during the adding of the sulphuryl chloride to the ammonia.

6. The process of making sulphamide, which consists in adding sulphuryl chloride to ammonia in the presence of an inert diluent, with the ammonia in sufficient amount so that throughout the reaction it is always in excess of 4 mols per mol of sulphuryl chloride and with the amount of the inert diluent in excess of the amount of the sulphuryl chloride, and after reaction has occurred recovering sulphamide from the reaction mixture.

7. The process of making sulphamide, which consists in adding sulphuryl chloride to ammonia, with the ammonia in sufficient amount so that throughout the reaction it is always in excess of 4 mols per mol of sulphuryl chloride, producing vigorous agitation of the reactants during the reaction in order to avoid localized heating, and after reaction has occurred recovering sulphamide from the reaction mixture.

8. The process of making sulphamide, which consists in injecting sulphuryl chloride into a stream of liquid ammonia, with the ammonia in sufficient amount so that throughout the reaction it is always in excess of 4 mols per mol of injected sulphuryl chloride, and after reaction has occurred recovering sulphamide from the reaction mixture.

9. The process of making sulphamide, which consists in injecting sulphuryl chloride into a stream of ammonia, with the ammonia in sufficient amount so that throughout the reaction it is always in excess of 4 mols per mol of injected sulphuryl chloride, maintaining the temperature within the stream of ammonia between −78° C. and +90° C., and after reaction has occurred recovering sulphamide from the reaction mixture.

10. The process of making sulphamide as set forth in claim 8, with the addition that the stream of liquid ammonia is a turbulent stream.

11. The process of making sulphamide as set forth in claim 8, with the addition that the injected sulphuryl chloride is dissolved in an inert diluent.

EDWARD F. DEGERING.
GEORGE C. GROSS.